United States Patent
Tottori et al.

[11] 3,925,554
[45] Dec. 9, 1975

[54] CERTAIN 3,5-DICHLOROPHENYL COMPOUND USED AS A PLANT FUNGICIDE

[75] Inventors: Nobumasa Tottori, Minoo; Toshiro Kato, Amagasaki; Yasuhisa Asano, Ooita; Minoru Ueda; Osamu Kirino, both of Takarazuka; Shigehiro Ooba, Kobe; Akira Fujinami, Ashiya; Toshiaki Ozaki, Toyonaka, all of Japan

[73] Assignee: Sumitomo Chemical Company, Limited, Japan

[22] Filed: Nov. 6, 1973

[21] Appl. No.: 413,326

[30] Foreign Application Priority Data
Nov. 30, 1972  Japan............................ 47-120436
Nov. 30, 1972  Japan............................ 47-120437

[52] U.S. Cl.................. 424/274; 424/285; 424/317
[51] Int. Cl.²............................................ A01N 9/22
[58] Field of Search................................... 424/274

[56] References Cited
UNITED STATES PATENTS
3,215,597  11/1965  Stevenson......................... 424/274
3,261,845  7/1966   Bockstahler..................... 424/274 X

*Primary Examiner*—Leonard Schenkman
*Attorney, Agent, or Firm*—Stewart and Kolasch, Ltd.

[57] ABSTRACT
An agricultural composition which comprises as an active ingredient at least one of the 3,5-dichlorophenyl compounds represented by either one of the following formulae:

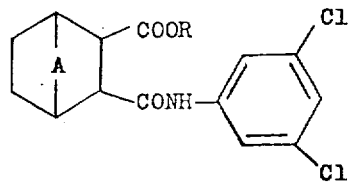

and

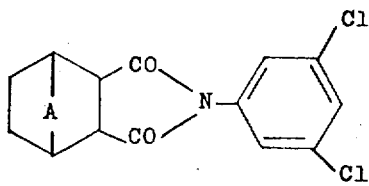

wherein A is a methylene group or an oxygen atom in the former formula and a methylene group in the latter formula and R is a hydrogen atom or an alkali metal atom. Said compounds show a strong anti-fungal activity against phyto-pathogenic fungi without any appreciable toxicity to crop plants or to mammals and fish.

16 Claims, No Drawings

CERTAIN 3,5-DICHLOROPHENYL COMPOUND USED AS A PLANT FUNGICIDE

The present invention relates to an agricultural composition. More particularly, it relates to an agricultural composition comprising as an active ingredient at least one of the 3,5-dichlorophenyl compounds represented by either one of the following formulae:

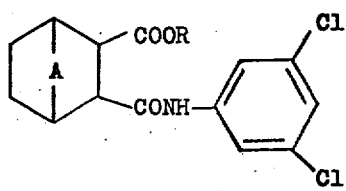

[I]

and

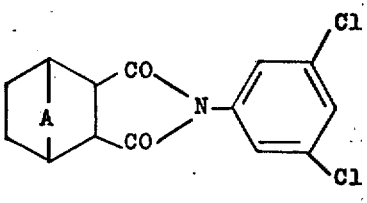

[II]

wherein A is a methylene group or an oxygen atom in Formula I but only a methylene group in Formula II and R is a hydrogen atom or an alkali metal atom (e.g. sodium, potassium), which exhibits a remarkable anti-fungal activity against phytopathogenic fungi without any appreciable toxicity to crop plants or to mammals and fish.

In the 3,5-dichlorophenol compounds represented by the formula [I] or [II], there are included the following three kinds of compounds:

Compound (I-A)

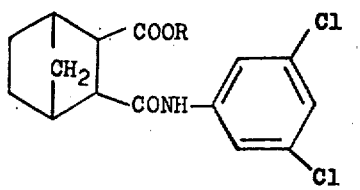

3-(3',5'-Dichlorophenylcarbamoyl)-norbornane-2-carboxylic acid and its alkali metal salt wherein R is as defined above;

Compound (I-B)

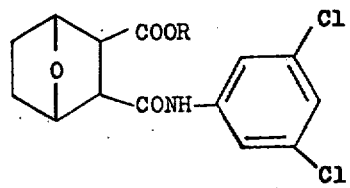

3-(3',5'-Dichlorophenylcarbamoyl)-7-oxabicyclo-(2,2,1)heptane-2-carboxylic acid and its alkali metal salt wherein R is as defined above; and Compound (II-A)

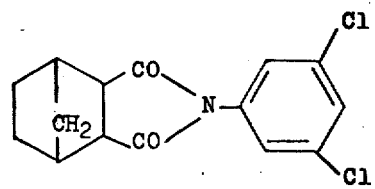

N-(3',5'-Dichlorophenyl)-norbornane-2,3-dicarboximide

These 3,5-dichlorophenyl compounds are known and described to be useful as veterinary medicaments [cf. U.S. Pat. Nos. 3,215,597 and 3,261,845]. Further, it is described that N-4-fluorophenyl-3,6-epoxyhexahydrophthalimide which does not fall within the compounds of the formulae [I] and [II] but is similar thereto in chemical structure has an acaricidal activity [cf. U.S. Pat. No. 3,261,845]. However, no literature has ever suggested the practical use of the 3,5-dichlorophenyl compounds [I] and [II] as an active ingredient in an agricultural composition, particularly in fungicidal compositions against phyto-pathogenic fungi.

As the result of extensive studies, it has now been found that the 3,5-dichlorophenyl compounds [I] and [II possess an unexpectedly high anti-fungal activity against phyto-pathogenic fungi including *Sclerotinia sclerotiorum*, *Rhizoctonia solani*, *Botrytis cinerea*, *Piricularia oryzae*, *Cochliobolus miyabeanus*, *Pellicularia sasakii*, etc. It has also been found that the 3,5-dichlorophenyl compounds [I] and [II] do not cause any phytotoxicity on crop plants when applied in an amount which is sufficient to exert an anti-fungal activity. It has further been found that the 3,5-dichlorophenyl compounds [I] and [II] exhibit an extremely low toxicity with regard to mammals and fish.

In this connection, it should be noted that a number of compounds closely related to the 3,5-dichlorophenyl compounds [I] and [II] in chemical structure have been known but their anti-fungal activity is so weak as to preclude any practical application.

According to the present invention, there is provided an agricultural composition, especially a fungicidal composition in a preparation form such as dusts, wettable powders, emulsifiable concentrates, sprays, aerosols, fumigants, pellets and granules, which comprises at least one of the 3,5-dichlorophenyl compounds [I] and [II] alone or in association with one or more gaseous, solid or liquid carriers of the types commonly used in fungicidal compositions. Besides the 3,5-dichlorophenyl compounds [I] and [II], the composition may contain one or more known fungicides (e.g. Blasticidin S, Kasugamycin, Polyoxin, Cellocidin, Chloramphenicol, Validamycin, Streptomycin, Griseofluvin, cycloheximide, pentachloronitrobenzene, pentachlorophenol and its salts, 2,6-dichloro-4-nitroaniline, zinc ethylenebis(dithiocarbamate), zinc dimethyldithiocarbamate, manganese ethylenebis(dithiocarbamate), bis(dimethylthiocarbamoyl)disulfide, 2,4,5,6-tetrachloroisophthalonitrile, 2,3-dichloro-1,4-naphthoquinone, tetrachloro-p-benzoquinone, tetrachlorophthalide, p-dimethylaminobenzenediazosodium sulfonate, 2-(1-methylheptyl)-4,6-dinitrophenylcrotonate, 2-heptadecylimidazoline acetate, 2,4-dichloro-6-(o-chloroanilino)-S-triazine, dodecylguanidine acetate, 6-methyl-2,3-quinoxalinedithiol cyclic S,S-dithiocarbonate, N-trichloromethylthio-4-cyclohexene-1,2-dicarboximide, N-(1,1,2,2-tetrachloroethylthio)-4-cyclohexene-1,2-dicarboximide, 3-(3,5-dichlorophenyl)-5,5-dimethyloxazolidinedione-2,4, N-(3,5-dichlorophenyl)-maleimide, N-(3,5-dichlorophenyl)-succinimide, N-(3,5-dichlorophenyl)-itaconimide, 2,3-dihydro-5-carboxanilide, 6-methyl-1,4-oxazine, 1-(N-butylcarbamoyl)-2-methoxycarbonylaminobenzimidazole, 2-(4'-thiazolyl)-benzimidazole, 1,2-bis(3-ethoxycarbonyl-2-thioureido)-benzene, 1,2-bis(3-methoxycarbonyl-2-thioureido)-benzene, 2-amino-5-mercaptothiadiazole, 2-aminothiadiazole, O-butyl-S-benzyl-S-ethylphorodithioate, O-ethyl-S,S-diphenylphosphorodithioate, O,O-diisopropyl-S-benzyophosphorothioate, O,O-dimethyl-O-(3-methyl-4-nitrophenyl)-phosphorothioate, S-[1,2-bis(ethoxycarbonyl)ethyl]-O,O-dimethylphosphorodithioate, O,O-dimethyl-S-(N-methylcarbamoylmethyl)-phosphorodithioate, O,O-diethyl-O-(2-isopropyl-6-methyl-4-pyrimidyl)-thiophosphate, 1,3-bis(carbamoylthio)-2-(N,N-dimethylamino)propane hydrochloride, 3,4-dimethylphenyl-N-methylcarbamate, 1-naphthyl-N-methylcarbamate, 2-chloro-4,6-bis(ethylamino)-S-triazine, 2,4-dichlorophenoxyacetic acid and its salts and esters, 2-methyl-4-chlorophenoxyacetic acid and its salts and esters, 2,4-dichlorophenyl-4-nitrophenyl ether, N-(3,4-dichlorophenyl)-propionamide, 3-(3",4'-dichlorophenyl)-1,1-dimethylurea, 4-chlorobenzyl-N,N-dimethylthiol carbamate, 1,1'-dimethyl-4,4'-bipyridium dichloride, 2,4,6-trichlorophenyl-4'-nitrophenyl ether, N'-(2-methyl-4-chlorophenyl)-N,N-dimethylformamidine, N,N-diallyl-2-chloroacetamide, ethyl(or cyclohexyl) β-(2,4-dichlorophenoxy)-acrylate, S-n-heptyl-S'-(p-t-butylbenzyl)-N-(3'-pyridyl)-imidodithiocarbonate, S-n-butyl-S'-(p-t-butylbenzyl)-N-(3-pyridyl)-imidodithiocarbonate, etc.). The composition may also contain one or more materials known to be active as bactericides, insecticides, nematocides, acaricides, herbicides, fertilizers, soil conditioners or plant growth regulators.

Typical examples of the agricultural composition according to this invention are:

a. Dusts obtained by dispersing at least one of the 3,5-dichloropheny compounds [I][I]and [II] as the active ingredient in a concentration of 0.1 to 30 % by weight in an inert carrier (e.g. talc, diatomaceous earth, wood flour, clay).

b. Wettable powders obtained by dispersing at least one of the 3,5-dichlorophenyl compounds [I and [II] as the active ingredient in a concentration of 0.2 to 80 % by weight in an inert adsorbent carrier (e.g. diatomaceous earth) together with a wetting and/or dispersing agent such as an alkali metal salt of a long aliphatic sulfate chain, a partly neutralized sulfuric acid derivative of either a petroleum oil or a natural occurring glycerine or a condensation product of an alkylene oxide with an organic acid.

c. Emulsifiable concentrates obtained by dispersing at least one of the 3,5-dichlorophenyl compounds [I] and [II] as the active ingredient in a concentration of 1 to 50 % by weight in an organic solvent (e.g. dimethylsulfoxide) plus a wetting and/or dispersing agent such as an alkali metal salt of a long aliphatic sulfate chain, a partly neutralized sulfuric acid derivative of either a petroleum oil or a natural occurring glycerine or a condensation product of an alkylene oxide with an organic acid.

d. Compositions of the 3,5-dichlorophenyl compounds [I] and [II] formulated in the manner commonly employed in the art for the preparation of fungicidal fumigants.

More specific examples of the agricultural composition of this invention are shown below. In these examples, parts and % are by weight.

EXAMPLE 1

Preparation of wettable powders:

A. Compound (II-A), i.e. N-(3',5'-dichlorophenyl)-norbornane-2,3-dicarboximide (M.P. 171.0°-172.5°C), (50 parts), a wetting agent (an alkylbenzenesulfonate) (5 parts) and diatomaceous earth (45 parts) are crushed and mixed well to form a wettable powder preparation containing 50 % of the active ingredient. The wettable powder preparation is diluted with water and then applied.

B. Compound (I-B: R=Na), i.e. sodium 3-(3',5'-dichlorophenylcarbamoyl)-7-oxabicyclo(2,2,1)heptane-2-carboxylate (M.P. 277°C (decomp.)), is used in place of Compound (II-A) for the formulation of a wettable powder preparation as in Example 1 (A).

EXAMPLE 2

Preparation of dusts:

A. Compound (I-A: R=H), i.e. 3-(3',5'-dichlorophenylcarbamoyl)-norbornane-2-carboxylic acid (M.P. 151.5°-153.5°C), (3 parts) and clay (97 parts) are crushed and mixed well to form a dust preparation containing 3 % of the active ingredient. The dust preparation is applicable as such.

B. Compound (I-B: R=H), i.e. 3-(3',5'-dichlorophenylcarbamoyl)-7-oxabicyclo(2,2,1)heptane-2-carboxylic acid (M.P. 183°-184°C), is used in place of Compound (I-A: R=H) for the formulation of a dust preparation as in Example 2 (A).

EXAMPLE 3

Preparation of emulsifiable concentrates:

A. Compound (II-A) (10 parts), dimethylformamide (70 parts), toluene (10 parts) and an emulsifier (polyoxyethylenedodecylphenol ether) (10 parts) are mixed well to form an emulsifiable concentrate preparation containing 10 % of the active ingredient. The emulsifiable concentrate preparation is diluted with water and then applied.

B. Compound (I-B: R=H) is used in place of Compound (II-A) for the formulation of an emulsifiable concentrate preparation as in Example 3 (A).

EXAMPLE 4

Preparation of fumigants:

A. Compound (II-A) (90 parts), a nitrite (3 parts), wood flour (2 parts) and diatomaceous earth (5 parts) are pulverized and mixed well to form a fumigant preparation containing 90 % of the active ingredient. The fumigant preparation is applied by fumigating on a heating fumigator.

B. Compound (I-B: R=H) is used in place of Compound (II-A) for the formulation of a fumigant preparation as in Example 4 (A).

EXAMPLE 5

Preparation of complex wettable powders:

A. Compound (II-A) (40 parts), S-n-butyl-S'-(p-t-butylbenzyl)-N-(3-pyridyl)-dithiocarbonate (10 parts), diatomaceous earth (45 parts) and a wetting agent (calcium ligninsulfonate) (5 parts) are pulverized and mixed well to form a complex wettable powder preparation containing 50 % of the active ingredients. The complex wettable powder preparation is diluted with water and then applied.

B. Compounds (I-B: R=H) (4 parts), manganese ethylenebis(thiocarbamate) (60 parts), diatomaceous earth (30 parts) and a wetting agent (an alkylbenzenesulfonate) (6 parts) are pulverized and mixed well to form a complex powder preparation containing 64 % of the active ingredients. The complex wettable powder preparation is diluted with water and then applied.

C. Compound (I-A: R=H) is used in place of Compound (I-B: R=H) for the formulation of a complex wettable powder preparation as in Example 5 (B).

Some of the test results which support the anti-fungal activity of the 3,5-dichlorophenyl compounds [I] and [II] are shown below.

The known compounds used in the following tests for comparison are as follows:

| Compound No. | Structure | Remarks |
| --- | --- | --- |
| 1 | | Disclosed in U.S. Pat. No. 3,215,597 |
| 2 | | Disclosed in U.S. Pat. No. 3,215,597 |
| 3 | | Disclosed in U.S. Pat. No. 3,215,597 |
| 4 | | Disclosed in U.S. Pat. No. 3,215,597 |
| 5 | | Disclosed in U.S. Pat. No. 3,215,597 |
| 6 | | Disclosed in U.S. Pat. No. 3,215,597 |
| 7 | | Disclosed in U.S. Pat. No. 3,215,597 |

TEST 1

A dust containing 3 % by weight of a test compound was applied to rice plants cultured in pots of 9 cm in diameter and grown up to about 60 cm tall at a dose of 3 kg of the dust per 10 are. After 1 day, a mycelium-disc-inoculum of *Pellicularia sasakii* (diameter, 5 mm) was inoculated on the sheath. The infectious state at the sheath was observed 5 days thereafter, and the degree of infection was calculated according to following equation:

$$\text{Degree of infection} = \frac{\Sigma \left( \begin{array}{c}\text{Infection} \\ \text{index}\end{array} \times \begin{array}{c}\text{Number} \\ \text{of stems}\end{array} \right)}{\text{Total number of stems} \times 3} \times 100$$

wherein the infection index was determined on the following criteria:

| Infection index | Infectious state |
| --- | --- |
| 0 | No infectious spots on sheath |
| 1 | Infectious spot-like parts |
| 2 | Infectious spots of less than 3 cm in size |
| 3 | Infectious spots of not less than 3 cm in size |

The results are shown in Table 1, from which it is seen that the 3,5-dichlorophenyl compound (I-B: R=H) has a stronger anti-fungal activity than the analogous compounds such as the corresponding monochlorinated compounds.

Table 1

| Test compound | Dose (as 3 % dust) (kg/10 are) | Degree of infection |
| --- | --- | --- |
| Present invention | | |
| Compound (I-B: R=H) | 3 | 0.0 |
| Comparison | | |
| Compound No. 3 | 3 | 100.0 |
| Compound No. 4 | 3 | 100.0 |
| Compound No. 5 | 3 | 77.8 |
| Untreated | — | 100.0 |

TEST 2

A test compound in wettable powder form was diluted with water and applied to kidney bean seedlings cultured in pots of 9 cm in diameter and grown up to the two leaved stage at a dose of 10 ml of the dilution per pot. After 4 hours, a mycelium-disc-inoculum of *Sclerotinia sclerotiorum* (diameter, 5 mm) was inoculated on the leaves. The infectious area at the leaves was observed 4 days thereafter, and the degree of damage was calculated according to the following equation:

$$\text{Degree of damage} = \frac{\Sigma \left( \begin{array}{c}\text{Infection} \\ \text{index}\end{array} \times \begin{array}{c}\text{Number of} \\ \text{leaves}\end{array} \right)}{\text{Total number of leaves}}$$

wherein the infectious index was determined on the following criteria:

| Infectious index | Infectious area |
| --- | --- |
| 0 | None |
| 1 | Only around the inoculated parts |
| 2 | Up to 1/5 of the total area of the inoculated leaf |
| 3 | More than 1/5 and up to 2/5 of the total area of the inoculated leaf |
| 4 | More than 2/5 and up to 3/5 of the total area of the inoculated leaf |
| 5 | More than 3/5 of the total area of the inoculated leaf |

The results are shown in Table 2, from which it is understood that the 3,5-dichlorophenyl compounds (I-A: R=H), (I-B: R=H), (I-B: R=Na) and (II-A) have a stronger anti-fungal activity than the analogous compounds such as the corresponding monochlorinated compounds.

Table 2

| Test compound | Concentration (ppm) | Degree of damage |
| --- | --- | --- |
| Present invention | | |
| Compound (I-A: R=H) | 100 | 0.2 |
| Compound (I-B: R=H) | 100 | 0.0 |
| Compound (I-B: R=Na) | 100 | 0.0 |
| Compound (II-A) | 100 | 0.0 |
| Comparison | | |
| Compound No. 1 | 100 | 5.0 |
| Compound No. 2 | 100 | 5.0 |
| Compound No. 3 | 100 | 5.0 |
| Compound No. 4 | 100 | 5.0 |
| Compound No. 5 | 100 | 3.0 |
| Compound No. 6 | 100 | 3.8 |
| Compound No. 7 | 100 | 5.0 |
| Commercially available fungicide | | |
| "Resisan"* | 100 | 2.4 |
| Untreated | — | 5.0 |

Note:
*Trade name for a fungicidal composition comprising 2,6-dichloro-4-nitroaniline as the active ingredient.

TEST 3

Kidney bean seedlings cultured in pots of 9 cm in diameter and grown up to the first trifoliate stage (five pots per plot) were exposed to fumes of a test compound, said fumes being produced on a heating fumigator. Exposure was made for 15 hours in a space enclosed by vinyl sheets, and then the vinyl sheets were removed. Besides, the plants as above were subjected to foliage treatment with a 1000 fold dilution of a 30 % wettable powder of the test compound at a dose of 100 liters of the dilution per 10 are. After seventeen hours from the treatments in both cases, a mycelium-disc-inoculum of *Sclerotinia sclerotiorum* was inoculated on the surface and the reverse of the leaves. The infectious area at the leaves was observed 4 days thereafter, and the degree of damage was calculated according to the following equation:

$$\text{Degree of damage} = \frac{\Sigma \left( \begin{array}{c}\text{Infection} \\ \text{index}\end{array} \times \begin{array}{c}\text{Number of} \\ \text{leaves}\end{array} \right)}{\text{Total number of leaves}}$$

wherein the infectious index was determined on the following criteria:

| Infectious index | Infectious area |
| --- | --- |
| 0 | None |
| 1 | Only around the inoculated parts |
| 2 | Up to 1/5 of the total area of the inoculated leaf |
| 3 | More than 1/5 and up to 2/5 of the total area of the inoculated leaf |
| 4 | More than 2/5 and up to 3/5 of the total area of the inoculated leaf |
| 5 | More than 3/5 of the total area of the inoculated leaf |

The results are shown in Table 3, from which it can be understood that the 3,5-dichlorophenyl compounds (I-B: R=H) and (II-A) exert an excellent anti-fungal activity not only when applied in a wettable powder form but also when applied in a fumigant form.

Table 3

| Plot | Test compound | Dose | Degree of damage | |
| --- | --- | --- | --- | --- |
| | | | Inoculated on surface | Inoculated on reverse |
| Fumigation | Compound (I-B: R=H) | 500 mg/m$^3$ | 0.0 | 0.0 |
| | | 100 mg/m$^3$ | 0.0 | 0.3 |
| | | 25 mg/m$^3$ | 0.0 | 0.8 |
| Foliage | Compound (I-B: R=H) | 100 L/10 a (as 1000 fold dilution of 30 % wettable powder) | 0.0 | 0.0 |
| Fumigation | Compound (II-A) | 500 mg/m$^3$ | 0.0 | 0.0 |
| | | 100 mg/m$^3$ | 0.0 | 0.0 |
| | | 25 mg/m$^3$ | 0.0 | 0.5 |
| Foliage | Compound (II-A) | 100 L/10 a (as 1000 fold dilution of 30 % wettable powder) | 0.0 | 0.0 |
| Untreated | — | — | 5.0 | 5.0 |

TEST 4

Cucumber seedlings were cultured in pots of 9 cm in diameter and, when grown up to the one leaved stage, the leaf was trimmed. A test compound in wettable powder form was diluted with water and applied to the seed leaf of the plants at a dose of 10 ml of the dilution per pot. After four hours, a mycelium-disc-inoculum of *Botrytis cinerea* (diameter, 5 mm) was inoculated on the leaves. The infectious area at the leaves was observed 5 days thereafter, and the degree of damage was calculated as in Test 3.

The results are shown in Table 4, from which it is seen that the 3,5-dichlorophenyl compounds (I-A: R=H), (I-B: R=H), (I-B: R=Na) and (II-A) exhibit a stronger anti-fungal activity than the analogous compounds such as the corresponding monochlorinated compounds.

Table 4

| Test compound | Concentration (ppm) | Degree of damage |
| --- | --- | --- |
| Present invention | | |
| Compound (I-A: R=H) | 200 | 0.1 |
| Compound (I-B: R=H) | 200 | 0.0 |
| Compound (I-B: R=Na) | 200 | 0.0 |
| Compound (II-A) | 200 | 0.0 |
| Comparison | | |
| Compound No. 1 | 200 | 4.5 |
| Compound No. 2 | 200 | 5.0 |
| Compound No. 3 | 200 | 5.0 |
| Compound No. 4 | 200 | 5.0 |
| Compound No. 5 | 200 | 3.1 |
| Compound No. 6 | 200 | 3.7 |
| Compound No. 7 | 200 | 5.0 |
| Commercially available fungicide | | |
| "Triazine"* | 200 | 1.4 |
| Untreated | — | 5.0 |

Note:
*Trade name for a fungicidal composition comprising 2,4-dichloro-6-(2-chloroaniline)-S-triazine as the active ingredient.

TEST 5

In each pot of 9 cm in diameter, there was charged field soil, and soil (10 ml) infected with *Pellicularia filamentosa* was dispersed over the surface. A test compound in emulsifiable concentrate form was diluted with water to make a 500 ppm concentration, and the dilution was poured into the said pot at a rate of 15 ml per pot. After four hours, 10 seeds of cucumber were sowed therein. Five days thereafter, the infectious state of the grown seedlings was observed, and the percentage of stand was calculated according to the following equation:

$$\text{Percentage of stand} = \frac{\text{Number of healthy seedlings in treated plot}}{\text{Number of germination in untreated plot}} \times 100$$

The results are shown in Table 5, from which it is understood that the 3,5-dichlorophenyl compounds (I-B: R=H) and (I-B: R=Na) have a stronger anti-fungal activity than the analogous compounds such as the corresponding monochlorinated compounds.

Table 5

| Test compound | Concentration (ppm) | Percentage of stand (%) |
| --- | --- | --- |
| Present invention | | |
| Compound (I-B: R=H) | 500 | 100 |
| Compound (I-B: R=Na) | 500 | 100 |
| Comparison | | |
| Compound No. 3 | 500 | 0 |
| Compound No. 4 | 500 | 0 |
| Compound No. 5 | 500 | 0 |
| Untreated | | |
| Inoculated | — | 0 |
| Not inoculated | — | 100 |

TEST 6

In each pot of 9 cm in diameter, there was charged field soil, and soil (10 ml) infected with *Fusarium oxysporum F. raphani* was dispersed over the surface. A test compound in emulsifiable concentrate form was diluted with water to make a 500 ppm concentration, and the dilution was poured into the said pot at a rate of 15 ml per pot. After 4 hours, 20 seeds of radish were sowed therein. Three weeks thereafter, the infectious state of the grown seedlings was observed, and the percentage of stand was calculated as in Test 5.

The results are shown in Table 8, from which it is understood that the 3,5-dichlorophenyl compounds (I-B: R=H) and (I-B: R=Na) have a stronger anti-fungal activity than the analogous compounds such as the corresponding monochlorinated compounds.

Table 6

| Test compound | Concentration (ppm) | Percentage of stand |
|---|---|---|
| Present invention | | |
| Compound (I-B: R=H) | 500 | 100 |
| Compound (I-B: R=Na) | 500 | 100 |
| Comparison | | |
| Compound No. 3 | 500 | 0 |
| Compound No. 4 | 500 | 0 |
| Compound No. 5 | 500 | 35 |
| Commercially available fungicide | | |
| "Tachigaren"* | 500 | 45 |
| Untreated | | |
| Inoculated | — | 0 |
| Not inoculated | — | 100 |

Note:
*Trade name for a fungicidal composition comprising 3-hydroxy-5-methylisoxazole as the active ingredient.

As understood from the above test results, the 3,5-dichlorophenyl compounds [I] and [II] are useful for the control and prevention of such plant diseases as Sclerotinia rot, Rhizoctonia rot and Botrytis gray mold of vegetables and field crops, and blast, brown leaf spot and sheath blight of rice plants.

The 3,5-dichlorophenyl compounds [I] and [II] may be applied as such. From the practical viewpoint, however, they are usually employed in the form of compositons in association with any agricultural acceptable inert carrier or diluent as well as any surface active agent or wetting agent. The concentration thereof in the compositions may be from about 0.1 to 90 % by weight, although such is not essential.

What is claimed is:

1. A method for killing phyto-pathogenic fungi on plants which comprises applying to said fungi a fungicidally effective amount of a 3,5-dichlorophenyl compound of the formula

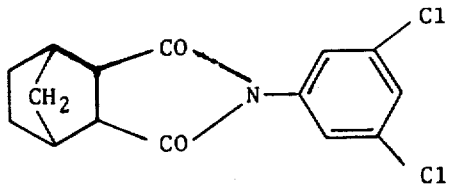

2. The method according to claim 1, wherein the 3,5-dichlorophenyl compound is applied to said fungi in the form of a composition comprising said compound and an inert carrier.

3. The method according to claim 2, wherein the concentration of the 3,5-dichlorophenyl compound in said composition is 0.1 to 90% by weight.

4. A method for killing phyto-pathogenic fungi selected from the group consisting of the genera Sclerotinia and Botrytis on plants which comprises applying to said fungi a fungicidally effective amount of a 3,5-dichlorophenyl compound of the formula:

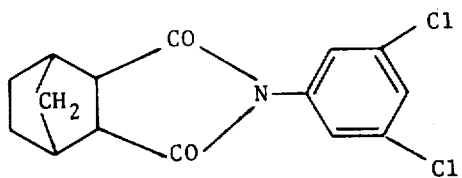

5. The method according to claim 4, wherein the 3,5-dichlorophenyl compound is applied to said fungi in the form of a composition comprising said compound and an inert carrier.

6. The method according to claim 4, wherein the phyto-pathogenic fungus is *Sclerotinia sclerotiorum*.

7. The method according to claim 4, wherein the phyto-pathogenic fungus is *Botrytis cinerea*.

8. A method for killing phyto-pathogenic fungi selected from the group consisting of *Sclerotinia sclerotiorum*, *Rhizoctonia solani*, *Botrytis cinerea*, *Piricularia oryzae*, *Cochliobolus miyabeanus*, *Pellicularia sasakii*, *Pellicularia filamentosa*, and *Fusarium oxysporum F. raphani* on plants which comprises applying to said fungi a fungicidally effective amount of a 3,5-dichlorophenyl compound of the formula:

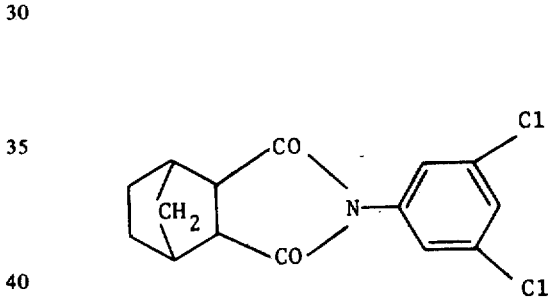

9. The method according to claim 8, wherein the 3,5-dichlorophenyl compound is applied to said fungi in the form of a composition comprising said compound and an inert carrier.

10. The method according to claim 8, wherein the concentration of the 3,5-dichlorophenyl compound in said composition is 0.1 to 90% by weight.

11. The method according to claim 8, wherein the phyto-pathogenic fungus is *Rhizoctonia solani*.

12. The method according to claim 8, wherein the phyto-pathogenic fungus is *Piricularia oryzae*.

13. The method according to claim 8, wherein the phyto-pathogenic fungus is *Cochliobolus miyabeanus*.

14. The method according to claim 8, wherein the phyto-pathogenic fungus is *Pellicularia sasakii*.

15. The method according to claim 8, wherein the phyto-pathogenic fungus is *Pellicularia filamentosa*.

16. The method according to claim 8, wherein the phyto-pathogenic fungus is *Fusarium oxysporum F. raphani*.

* * * * *